United States Patent
Rajalekshmi et al.

(10) Patent No.: US 12,449,483 B2
(45) Date of Patent: Oct. 21, 2025

(54) HEALTH STATUS OF AN INTERNAL POWER SOURCE OF A FAULTED CIRCUIT INDICATOR

(71) Applicant: Eaton Intelligent Power Limited, Dublin (IE)

(72) Inventors: Rakhi Rajalekshmi, Pune (IN); Sonal Arora, Chhattisgarh (IN)

(73) Assignee: Eaton Intelligent Power Limited, Dublin (IE)

( * ) Notice: Subject to any disclaimer, the term of this patent is extended or adjusted under 35 U.S.C. 154(b) by 949 days.

(21) Appl. No.: 17/518,731

(22) Filed: Nov. 4, 2021

(65) Prior Publication Data

US 2022/0170994 A1    Jun. 2, 2022

Related U.S. Application Data

(60) Provisional application No. 63/120,305, filed on Dec. 2, 2020.

(51) Int. Cl.
*G01R 31/392*  (2019.01)
*G01R 31/3835*  (2019.01)
*H01M 10/48*  (2006.01)

(52) U.S. Cl.
CPC ........ *G01R 31/392* (2019.01); *G01R 31/3835* (2019.01); *H01M 10/486* (2013.01); *H01M 10/488* (2013.01)

(58) Field of Classification Search
CPC ............. G01R 31/392; G01R 31/3835; H01M 10/486; H01M 10/488
USPC ........................................ 320/132, 152, 153
See application file for complete search history.

(56) References Cited

U.S. PATENT DOCUMENTS

| | | | |
|---|---|---|---|
| 6,133,724 A * | 10/2000 | Schweitzer, Jr. | ...... G01R 31/58 324/133 |
| 6,822,576 B1 | 11/2004 | Feight et al. | |
| 8,274,394 B2 | 9/2012 | Feight | |
| 9,386,529 B2 * | 7/2016 | Swartzendruber | .......................... H04W 52/0261 |
| 2009/0119068 A1 * | 5/2009 | Banting | .............. G06F 11/0781 340/653 |
| 2009/0167238 A1 | 7/2009 | McBee | |

(Continued)

FOREIGN PATENT DOCUMENTS

WO      2010027559 A1      3/2010

OTHER PUBLICATIONS

Thomas Agerbaek, European International Searching Authority, International Search Report and Written Opinion, counterpart PCT Application No. PCT/EP2021/025462 mailed Mar. 18, 2022, 12 pages total.

*Primary Examiner* — Richard V Muralidar
(74) *Attorney, Agent, or Firm* — DiBerardino McGovern IP Group LLC (57) ABSTRACT

A faulted circuit indicator includes: a power source; a sensor system configured to measure a voltage at the power source and a temperature at the power source; a controller coupled to the sensor system. The controller is configured to determine a health status of the power source based on the measured voltage at the power source and the measured temperature at the power source. The faulted circuit indicator also includes an indicator module coupled to the controller. The indicator is configured to provide an indication of the health status of the power source.

22 Claims, 5 Drawing Sheets

(56) References Cited

U.S. PATENT DOCUMENTS

2011/0001485 A1\* 1/2011 Feight ................... H02J 1/10
                                                                             307/43

\* cited by examiner

HEALTH STATUS OF AN INTERNAL POWER SOURCE OF A FAULTED CIRCUIT INDICATOR

CROSS-REFERENCE TO RELATED APPLICATION

This application claims the benefit of U.S. Provisional Application No. 63/120,305, filed on Dec. 2, 2020 and titled HEALTH STATUS OF AN INTERNAL POWER SOURCE OF A FAULTED CIRCUIT INDICATOR, which is incorporated herein by reference in its entirety.

TECHNICAL FIELD

This disclosure relates to a health status of an internal power source of a faulted circuit indicator (FCI).

BACKGROUND

A faulted circuit indicator (FCI) is a device that is used to provide a visual or remote indication of a fault in a monitored electrical circuit or electrical system.

SUMMARY

In one aspect, a faulted circuit indicator includes: a power source; a sensor system configured to measure a voltage at the power source and a temperature at the power source; and a controller coupled to the sensor system. The controller is configured to determine a health status of the power source based on the measured voltage at the power source and the measured temperature at the power source. The faulted circuit indicator also includes an indicator module coupled to the controller. The indicator is configured to provide an indication of the health status of the power source.

Implementations may include one or more of the following features. The sensor system may include a temperature sensor and a voltage sensor, the temperature sensor may be configured to measure the temperature at the power source, and the voltage sensor may be configured to measure the voltage at the power source. The controller may include an electronic memory that stores at least one characteristic of the power source, and the controller may be configured to determine the health status of the power source based on the measured temperature, the measured voltage, and the at least one characteristic of the power source. The power source may be a battery, the electronic memory may store a plurality of characteristics of the battery, each characteristic may be a pre-known relationship between discharge voltage across the battery and capacity of the battery, and each characteristic may be associated with a different pre-known temperature. The health status of the battery may be an estimate of a capacity of the battery.

The faulted circuit indicator also may include a housing. In these implementations, the power supply, the sensor system, and the controller are inside the housing. The indicator module may be on the housing, and the indication may be perceivable from an exterior of the housing. The indicator module may include one or more of a light, a mechanical switch, and a mechanism configured to produce an audible sound. The housing may include a mounting point configured to mount the faulted circuit indicator to a separate device that is electrically connected to a power system.

The indicator module may be configured to provide the indication to a device that is separate from the faulted circuit indicator.

The controller may be a microcontroller.

The indication of the health status of the power source may include an estimate of an amount of life remaining in the power source.

In another aspect, a controller includes: an electronic processing module; an electronic memory coupled to the electronic processing module, the electronic memory having stored thereon one or more characteristics of an internal power source of a faulted circuit indicator and instructions that, when executed, cause the electronic processing module to: determine a health status of the internal power source based on at least one of the one or more characteristics of the internal power source and at least one measured operating condition of the power source.

Implementations may include one or more of the following features. The at least one measured operating condition may include a measured temperature at the power source and a measured voltage at the power source.

The instructions also may include instructions that, when executed, cause the processing module to communicate with an indicator module such that the indicator module produces a perceivable indication of the health status.

In another aspect, a plurality of voltage values are measured, each voltage value being a measured voltage across a battery enclosed in a housing of a faulted circuit indicator at a different time; a temperature at the battery is measured; whether a fault occurs in a power system electrically connected to the faulted circuit indicator is determined; and if a fault does not occur: one of a plurality of pre-known discharge characteristics associated with the battery are accessed, each of the pre-known discharge characteristics being associated with a pre-known temperature; and the measured voltage values are compared to at least one of the pre-known discharge characteristics.

Implementations may include one or more of the following features. In some implementations, if a fault does not occur: whether any of the plurality of pre-known discharge characteristics fit the measured voltage values is determined based on the comparing of the measured voltage values to at least one of the pre-known discharge characteristics; and if one of the plurality of pre-known discharge characteristics fits the measured voltage values: a remaining life of the battery is estimated based on comparing the measured voltage values to the one of the pre-known discharge characteristics; and an indication of the estimated remaining life of the battery is produced. A closest temperature may be determined by comparing the measured temperature to the pre-known temperature, and the one of the plurality of pre-known discharge characteristics may be the pre-known discharge characteristic associated with the closest temperature. The one pre-known discharge characteristic may be a relationship between voltage and battery capacity for the closest temperature, and estimating a remaining life of the battery may include determining a capacity metric that corresponds to one or more of the measured voltage values. In some implementation, if a fault does not occur and if none of the plurality of pre-known discharge characteristics fit the measured voltage values, a second plurality of voltage values are measured, each voltage value being a measured voltage across a battery enclosed in the housing of the faulted circuit indicator at a different time.

In some implementations, if a fault occurs, the faulted circuit indicator is reset; and, after resetting the faulted circuit indicator, a second plurality of voltage values is measured, each voltage value being a measured voltage across a battery enclosed in the housing of the faulted circuit indicator at a different time. In some implementations, if a fault occurs, the measured plurality of voltage values are discarded.

Implementations of any of the techniques described herein may include a system, a faulted circuit indicator, an electronic controller, and/or a method. The details of one or more implementations are set forth in the accompanying drawings and the description below. Other features will be apparent from the description and drawings, and from the claims.

DETAILED DESCRIPTION

Figure 1:
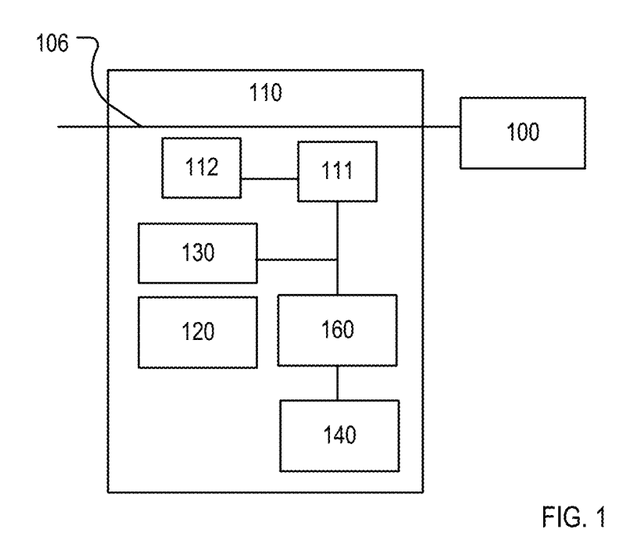
FIG. 1 is a block diagram of an example of a faulted circuit indicator (FCI).

FIG. 1 is a block diagram of a faulted circuit indicator (FCI) 110. The FCI 110 includes a fault sensing system 111, an energy collecting system 112, an indicator module 140, and an electronic controller 160. The fault sensing system 111 collects data related to the electricity that flows in the electrical system 100. For example, the fault sensing system 111 may measure the voltage and/or current of the electricity that flows in a distribution path 106 of the electrical system 100. The electronic controller 160 determines whether or not there is a fault in the electrical system 100 based on the data from the fault sensing system 111. A fault is an electrical current or voltage that has characteristics (amplitude, frequency, and/or phase) that deviate from the expected or nominal values. Faults may be caused by, for example, lightning striking the distribution path 106, debris falling on the distribution path 106, or malfunction of equipment in the electrical system 100.

Under ordinary operating conditions, the energy collecting system 112 powers the electronic controller 160 and the indicator module 140 with electrical power from the distribution path 106. However, the FCI 110 also includes an internal power source 120 that provides power to the electronic controller 160 and the indicator module 140 when the energy collecting system 112 is unable to provide power. In other words, the internal power source 120 is a back-up power supply for the FCI 110.

The FCI 110 also includes a monitoring system 130 that measures one or more conditions at the internal power source 120. The electronic controller 160 determines a health status of the internal power source 120 based on the measured condition or conditions. The electronic controller 160 also causes the indicator module 140 to provide an indication of the health status of the internal power source 120.

As discussed below, monitoring the health status of the internal power source 120 improves the performance and reliability of the FCI 110. For example, the internal power source 120 has a finite lifetime, and the FCI 110 provides an indication of the health of the internal power source 120 that allows an operator to determine whether to replace the FCI 110 and/or the internal power source 120. The indication of the health also allows the operator to determine whether the FCI 110 failed due to degradation of the internal power source 120. Moreover, using the measured condition or conditions at the internal power source 120 to determine the health status results in a more accurate determination as compared to an approach that relies on ambient conditions or estimated conditions.

Figure 2A:
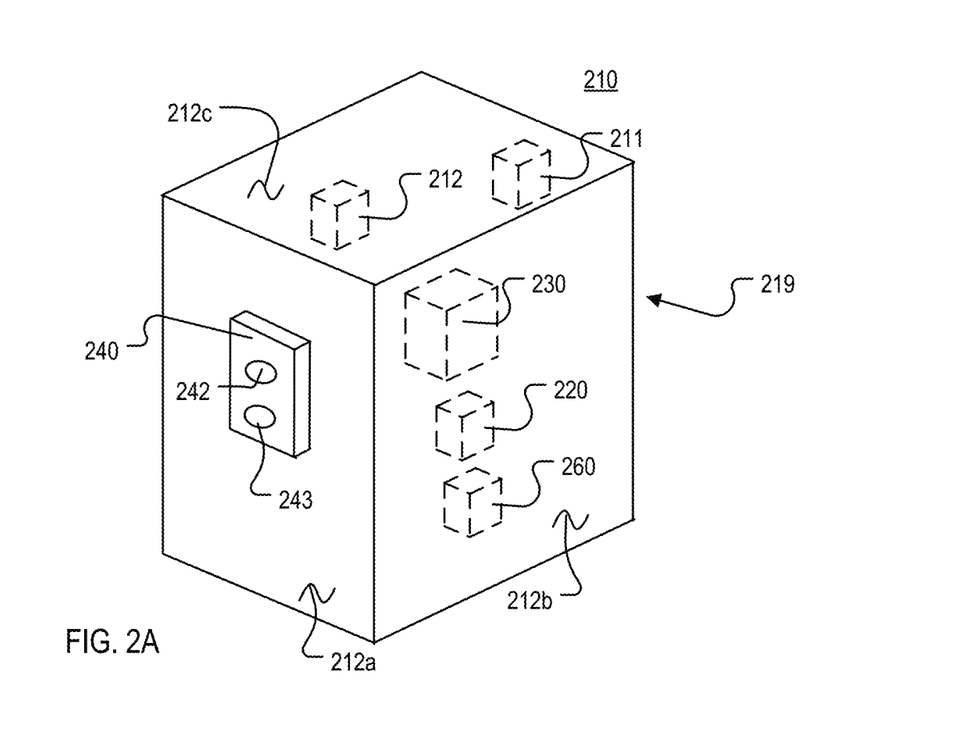
FIG. 2A is a perspective exterior view of another example of an FCI.
Figure 2B:
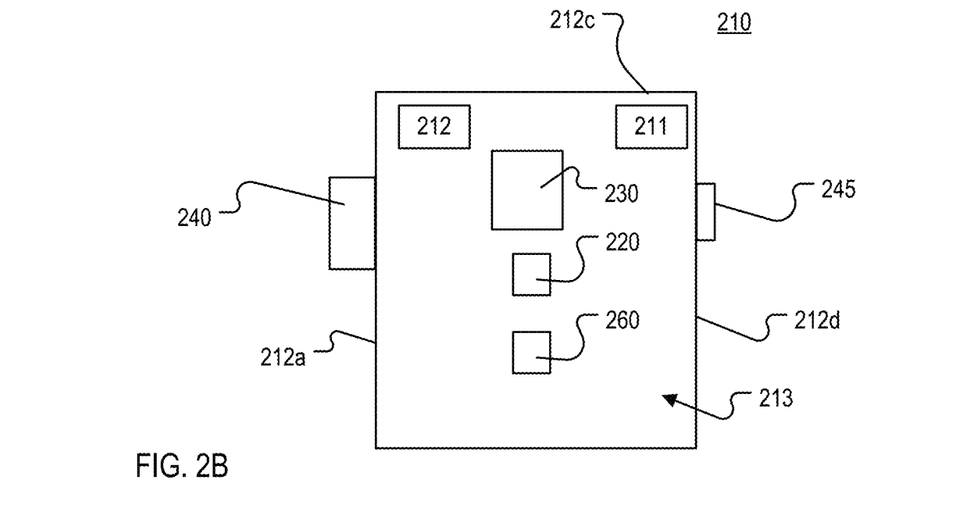
FIG. 2B is a side cross-sectional view of the FCI of FIG. 2A.
Figure 2C:
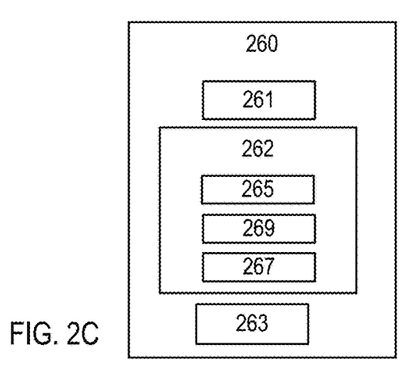
FIG. 2C is a block diagram of an electronic controller of the FCI of FIG. 2A.

FIG. 2A is a perspective block diagram of an exterior of an FCI 210. FIG. 2B is a side block diagram of a cross-sectional view of an interior 213 of the FCI 210. FIG. 2C is a block diagram of an electronic controller 260.

The FCI 210 is an example of an implementation of the FCI 110. The FCI 210 includes a housing 219 that defines the interior 213. The housing 219 has six solid walls that define the interior 213. Four walls 212a, 212b, 212c, 212d are shown in FIG. 2A and/or FIG. 2B. The six walls define the interior 213. The walls are made out of a durable material such as, for example, a rugged polymer material. In the example shown, the six walls form a parallelpiped. However, the FCI 210 may be any shape and may include more or fewer than six walls.

The FCI 210 includes an internal power source 220, a monitoring system 230, and the electronic controller 260, all of which are in the interior 213. The internal power source 220 may be, for example, a battery, such as, for example, an alkaline battery or a rechargeable lithium ion battery. In FIG. 2A, the internal power source 220 and the monitoring system 230 are depicted with dotted lines to indicate that they are hidden and are within the interior 213.

The FCI 210 also includes an energy collecting system 212. The energy collecting system 212 may be, for example, a transformer or other device that inductively couples to the power system that the FCI 210 monitors. The energy collecting system 212 provides power to the electronic controller 260 and the indicator module 240 when electrical current flows in the monitored power system. The internal power source 220 provides power to the electronic controller 260 and the indicator module 240 when the energy collecting system 212 is unable to provide power. The FCI 210 also includes a fault sensing system 211, which includes a sensor system that measures one or more electrical quantities in the portion of the electrical circuit that the FCI 210 monitors. For example, the fault sensing system 211 may include a voltage transformer, a current transformer, and/or a Rogowski coil.

The FCI 210 also includes an indicator module 240 and a connection point 245. The indicator module 240 and the connection point 245 are on the exterior of the FCI 210. In the example shown in FIGS. 2A and 2B, the indicator module 240 is on the wall 212a and the connection point 245 is on the wall 212d. Other configurations are possible.

The connection point 245 is used to connect the FCI 210 to an external electrical circuit or to an external device that is electrically connected to the circuit. For example, the connection point 245 may be an electrical connection that electrically connects the FCI 210 to the distribution path 106 (FIG. 1). In another example, the connection point 245 may be a connection that electrically and mechanically connects the FCI 210 to a device (such as an elbow or T-shaped arrester or clamps for overhead power lines) that is electrically connected to the distribution path 106.

The indicator module 240 includes indicator mechanisms 242 and 243. The indicator mechanism 242 is configured to produce a perceivable indication related to whether or not a fault exists in the monitored electrical circuit. The indicator mechanism 243 is configured to produce a perceivable indication of the health status of the internal power source 220.

The indicator mechanisms 242 and 243 are any type of mechanism capable of producing a perceivable indication. For example, the indicator mechanisms 242 and 243 may be lights (for example, light-emitting-diodes (LEDs)), speakers or other devices that emit sound, a mechanical switch that moves between two or more possible positions, an electronic display (such as a 7-segment display), or electronic transmitters that emit electrical signals encoded with information that is readable by an external electronic processor. In some implementations, the indicator mechanism 242 is a different type of mechanism than the indicator mechanism 243. For example, the indicator mechanism 242 may be an LED and the indicator mechanism 243 may be a mechanical switch.

Moreover, in some implementations, the indicator mechanism 242 and the indicator mechanism 243 may be the same type of mechanism but are configured such that an operator is able to distinguish the mechanisms 242 and 243 based on visual inspection. For example, the indicator mechanisms 242 and 243 may be LEDs that each emit a different color of light. Furthermore, the indicator mechanism 242 and/or the indicator mechanism 243 may include more than one indicator. For example, the indicator mechanism 242 may include more than one LED, or an LED and a sound emitter. In another example, the indicator mechanism 243 may include an LED and an electronic transmitter.

The indicator mechanisms 242 and 243 are controlled by the electronic controller 260. FIG. 2C is a block diagram of the electronic controller 260. The electronic controller 260 includes an electronic processing module 261, an electronic storage 262, and an input/output (I/O) interface 263.

The electronic processing module 261 includes one or more electronic processors, each of which is any type of electronic processor. For example, the electronic processing module 261 may include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 262 is any type of electronic memory that is capable of storing data and instructions in the form of computer programs or software, and the electronic storage 262 may include volatile and/or non-volatile components. The electronic storage 262 and the electronic processing module 261 are coupled such that the processing module 261 is able to access or read data from and write data to the electronic storage 262.

Data 265 and a health status determination module 269 are stored on the electronic storage 262. The data 265 includes pre-known information about the internal power source 220. For example, the data 265 may be provided by the manufacturer of the internal power source 220. In these implementations, the data 265 may be data for a class or type of power source that includes the internal power source 220. In other implementations, the data 265 is measured for the particular internal power source 220 that is installed in the FCI 210.

The data 265 is any data that describes the expected performance of the internal power source 220. For example, the data may include self-discharge characteristics. Each self-discharge characteristic includes values of the self-discharge voltage and associated discharge capacity of the internal power source 220 at a particular temperatures. The self-discharge voltage of the internal power source 220 is the voltage measured across the source 220 when the source 220 is not supplying power to an external electrical circuit. The internal power source 220 is only used as a back-up power source and is expected to have a relatively long life (for example, about 20 years). The degradation of the internal power source 220 is primarily caused by self-discharge.

Figure 2D:
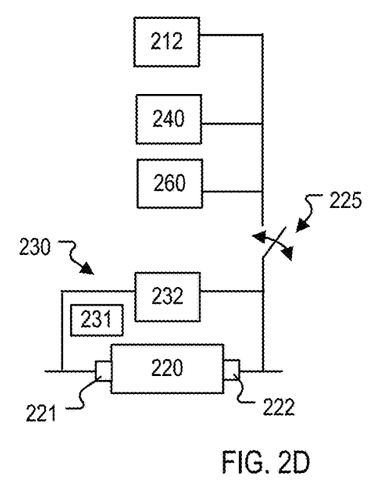
FIG. 2D is a partial schematic of the FCI of FIG. 2A.
Figure 2E:
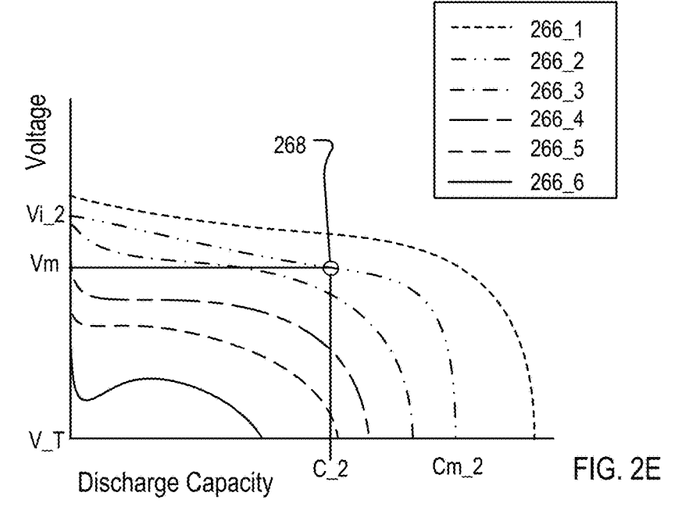
FIG. 2E are examples of self-discharge characteristics for an internal energy source of the FCI of FIG. 2A.

FIG. 2E shows examples of the self-discharge characteristic of the source 220 at 1 ampere (A) for six different temperatures. The six temperatures shown in FIG. 2E are: 85° C. (plot 266_1), 22° C. (plot 266_2), 0° C. (plot 266_3), −20° C. (plot 266_4), −30° C. (plot 266_5), and −40° C. (plot 266_6). In FIG. 2E, the units of voltage are volts (V), and the units of discharge capacity are milliamp-hours (mAh). The minimum voltage value shown in FIG. 2E is a voltage V_T. The voltage V_T is the self-discharge voltage below which the internal power source 220 is not usable. As shown in FIG. 2E, the self-discharge characteristic is different for each temperature.

The health status determination module 269 is a collection of executable instructions, callable functions and/or procedures, and/or computer software capable of being executed by the electronic processing module 261. In some implementations, the health status determination module 269 includes a collection of executable instructions that implement the process 300 shown in FIG. 3. The health status determination module 269 determines the health status of the internal power source 220 based on measured data or information from the source monitoring system 230. The health status determination module 269 also may use the data 265 to determine the health status of the internal power source 220.

The monitoring system 230 monitors one or more conditions at the internal power source 220. FIG. 2D is a partial schematic of the FCI 210. The internal power source 220 includes a first terminal 221 and a second terminal 222. The voltage sensor 232 is electrically connected to the terminals 221 and 222. The internal power source 220 is also electrically connected to the electronic controller 260 and the indicator module 240 when a switch 225 is closed. The switch 225 transitions to the closed state to electrically connect the electronic controller 260 and the indicator module 240 to the internal power supply 220 when the energy collecting system 212 is unable to provide power. The switch 225 is closed only when the energy collecting system 212 does not provide power. The switch 225 may be, for example, a transistor.

The monitoring system 230 includes a temperature sensor 231 that monitors the temperature at the internal power source 220 and a voltage sensor 232 that measures the voltage across the internal power source 220. The temperature sensor 231 is any type of sensor that is capable of measuring the temperature. For example, the temperature sensor 231 may be a thermocouple, a resistance temperature detector, or a thermistor. The temperature sensor 231 is in the interior 213 of the housing 219, and the temperature sensor 231 measures the temperature at the internal power source 220. The temperature at the internal power source 220 is generally greater than an ambient temperature outside of the housing 219 or the temperature in a portion of the interior 213 that is not at the internal power source 220. For example, because of the enclosed nature of the housing 219, the temperature at the internal power source 220 may be 5 to 15 degrees)(° higher than the ambient temperature. The health status of the internal power source 220 depends on the temperature of the source 220. For example, as shown in FIG. 2E, the self-discharge characteristic of the internal power source 220 varies with temperature. Thus, by measuring the actual temperature at the internal power source 220, the accuracy of the estimate of the health status of the internal power source 220 is improved.

The health status is any type of measure of the health of the internal power source 220. For example, the health status may be an estimate of the discharge capacity of the internal power source 220, an estimate of an amount of hours of use remaining for the internal power source 220, or an estimate of the portion of the original discharge capacity of the internal power source 220 that has been used.

The health status determination module 269 also may include executable instructions that categorize the health status. For example, the health status may be compared to a health status specification that is stored on the electronic storage 262. The health status specification is a threshold, range, or rule that categorizes the determined health status. For example, the health status specification may specify more than one class or category for the health of the internal power source 220. In these implementations, the health status specification may include, for example, a first discharge capacity range in which the internal power source 220 is classified as "healthy", a second discharge capacity range in which the internal power source 220 is classified as "marginal" or "weak", and a third discharge capacity range in which the internal power source 220 is classified as "unusable" or "needs recharging."

The electronic storage 262 stores information that associates the various classifications with an indication style, and the electronic processing module 261 controls the indicator mechanism 243 to produce the indication style based on the classification of the health status indicator. For example, if the indicator mechanism 243 is an LED, the electronic processing module 262 causes the LED to emit a solid light beam when the internal power source is classified as "healthy," a first blinking pattern when the internal power source is classified as "marginal," and a second blinking pattern when the internal power source is classified as "unusable." The first and second blinking patterns are visually distinguishable from each other. For example, the first and second blinking patterns may have different rates.

In another example, the health status specification includes a single discharge capacity value. If the health status determination module 269 determines that the actual discharge capacity is less than the threshold capacity value, then the electronic processing module 262 causes the indicator mechanism 243 to produce a first perceivable indication. If the actual discharge capacity is greater than or equal to the single discharge capacity value, then the electronic processing module 262 controls the indicator mechanism 243 to produce a second perceivable indication.

The electronic storage 262 may store additional executable instructions and data. For example, in the example of FIG. 2C, the electronic storage 262 also stores executable instructions that implement a fault detecting module 267. The fault detecting module 267 analyzes data from the fault sensing system 211. The fault detection module 267 compares the data from the fault sensing system 211 to a fault specification that is also stored on the electronic storage. The fault specification may include current and/or voltage values. If the magnitude of the electrical quantities measured by the fault sensing system 211 exceed the values in the fault specification, then the fault detecting module 267 declares a fault.

The I/O interface 263 is any interface that allows a human operator and/or an autonomous process to interact with the FCI 210. The I/O interface 263 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interface 263 also may allow communication without physical contact through, for example, an IEEE 802.11, Bluetooth, or a near-field communication (NFC) connection. The control system 260 may be, for example, operated, configured, modified, or updated through the I/O interface 263.

The I/O interface 263 also may allow the electronic controller 260 to communicate with systems external to and remote from the FCI 210. For example, the I/O interface 263 may include a communications interface that allows communication between the electronic controller 260 and a remote station (not shown), or between the electronic controller 260 and a separate electrical apparatus in the electrical system 100 (FIG. 1) using, for example, the Supervisory Control and Data Acquisition (SCADA) protocol or another services protocol, such as Secure Shell (SSH) or the Hypertext Transfer Protocol (HTTP). The remote station may be any type of station through which an operator is able to communicate with the electronic controller 260 without making physical contact with the electronic controller 260. For example, the remote station may be a computer-based work station, a smart phone, tablet, or a laptop computer that connects to the electronic controller 260 via a services protocol, or a remote control that connects to the electronic controller 260 via a radio-frequency signal. The electronic controller 260 may communicate information such as the determined tap position through the I/O interface 263 to the remote station or to a separate electrical apparatus.

Figure 3:
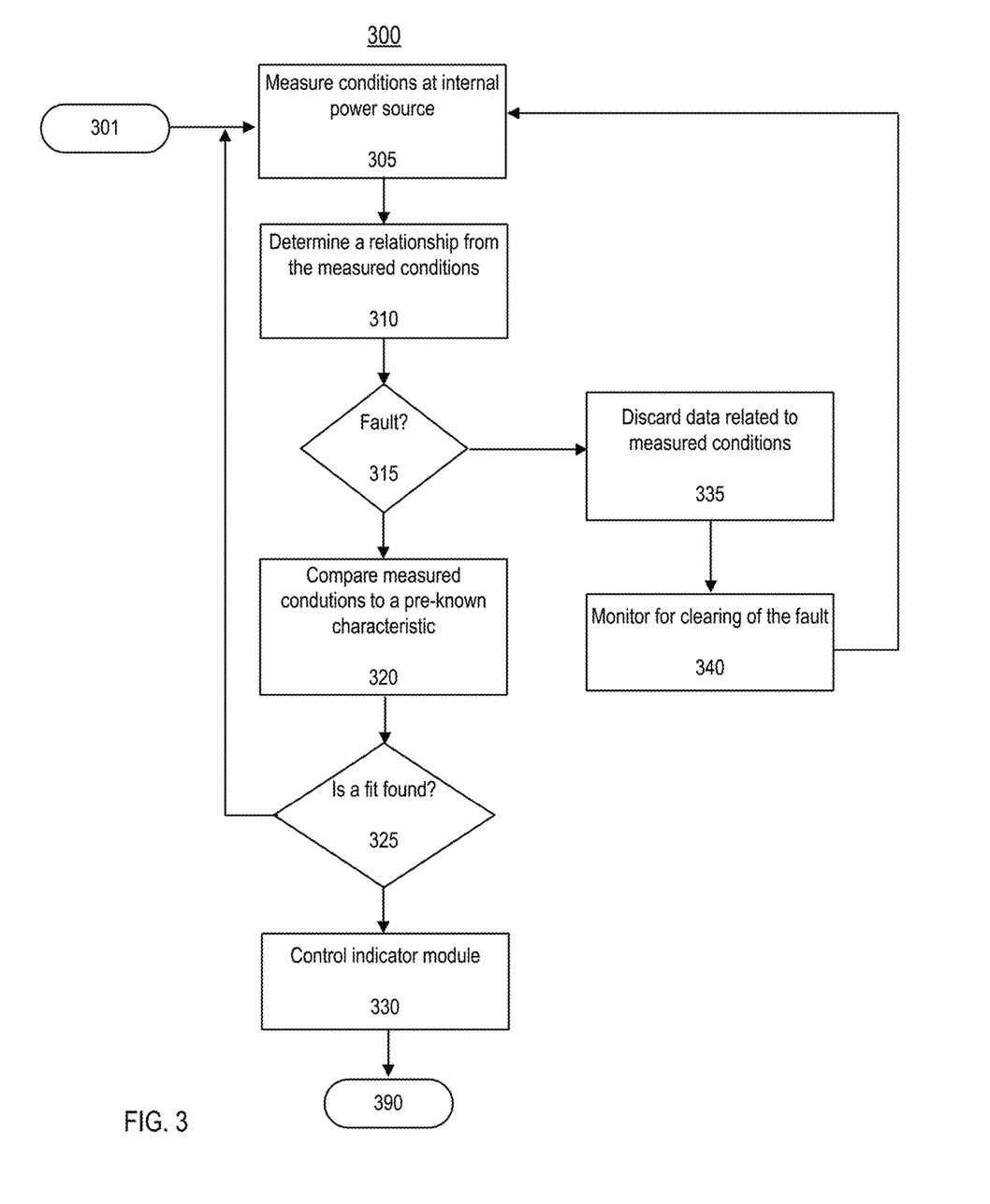
FIG. 3 is a flow chart of an example of a process for monitoring an internal power source of an FCI.

FIG. 3 is a flow chart of a process 300. The process 300 is an example of a process for monitoring a health status of a back-up power source in an FCI. The process 300 is discussed with respect to the FCI 210. In the example discussed below, the process 300 is performed by the electronic processing module 261 and is implemented as part of the health status determination module 269.

The process 300 begins (301). The process 300 may begin when the FCI 210 is installed or deployed. The health status determination module 269 may be configured such that the process 300 is initiated automatically when the FCI 210 is installed or deployed. In some implementations, the health status determination module 269 is configured such that the process 300 is initiated based on a command received through the I/O interface 263. For example, the process 300 may be initiated by an operator who installs the FCI 210. In another example, the process 300 may be initiated by a command from a remote station that is received at the I/O interface 263.

Conditions at the internal power source 220 are measured (305). For example, the voltage sensor 232 measures the self-discharge voltage of the internal power source 220. The self-discharge voltage is the voltage across the internal power source 220 while the internal power source 220 is not supplying power to an external circuit (for example, when the switch 225 is open). The voltage sensor 232 measures the voltage across the internal power source 220 at more than one time. The measured voltage values and their associated time stamps are stored on the electronic storage 262. For example, the voltage sensor 232 may measure the voltage across the internal power source 220 continuously and may provide a measured value to the electronic storage 262 every millisecond, every 100 milliseconds (ms), or every second.

The temperature sensor 231 measures the temperature at the internal power source 220 and provides an indication of the temperature over the time period during which the voltage values are obtained to the electronic controller 260. For example, if five voltage values are obtained, with one voltage value being obtained every 1 ms, the temperature sensor 231 provides the temperature over the same 5 ms period. The temperature sensor 231 may provide five separate temperature values that are obtained at the same time as the voltage values, or an average of the temperature over the 5 ms period. Regardless of the specific form of the temperature values, the temperature data provided by the temperature sensor 231 is representative of the actual temperature of the internal power source 220 during the time period when the self-discharge voltage values are obtained.

A relationship is determined from the measured conditions (310). The relationship is a statistical or mathematical model of the observed measured values. For example, the measured voltage values may be fit to a curve or line to determine an estimated self-discharge rate for the internal power source 220. Any technique may be used to determine the relationship. For example, linear or non-linear regression may be used to fit the measured voltage values to determine the relationship, or any type of model may be applied to the measured voltage values to determine the relationship. The difference between any two measured voltage values is a change in the self-discharge voltage (ΔSDV).

It is determined whether or not there is not a fault in the monitored electrical system during the time period in which the voltage samples were obtained (315). For example, the fault detection module 267 may compare data measured by the fault sensing system 211 to the fault specification to determine whether or not a fault has occurred.

If a fault occurred, the measured voltage values are discarded (335), and the process 300 waits until the fault is cleared (340). After the fault is cleared, the process 300 returns to (310) and measures another set of voltage values.

If a fault does not occur while the voltage values are measured, the measured voltage values are compared to a pre-known characteristic of the internal power source 220 (320). The pre-known characteristic may be, for example, one or more self-discharge characteristics, such as shown in FIG. 2E. The measured temperature value is compared to the temperature associated with each of the self-discharge characteristics to determine if any of the temperatures associated with a self-discharge characteristic has a temperature that within a threshold difference of the measured temperature. The threshold difference is a pre-determined difference that is stored on the electronic storage 262. The threshold difference may be a value in degrees or a percentage. For example, the threshold difference may be +/−2° C. In this example, if the measured temperature was 20° C., the self-discharge characteristic 266_2 (which is associated with a temperature of 22° C.) would be selected for comparison purposes. In other examples, the threshold difference is expressed as a percentage. Moreover, the threshold difference may be set to zero such that only a self-discharge characteristic at the same temperature as the measured temperature can be selected.

The relationship determined from the measured voltage values in (310) is compared to the selected pre-known self-discharge characteristic. For example, continuing the example of the self-discharge characteristic 266_2 being the selected pre-known characteristic, the determined relationship is compared to the characteristic 266_2. The measured voltage values are collected over a period of time (for example, a few or tens of milliseconds) that is short compared to the expected lifetime of the internal power source 220 (for example, 20 years). Thus, the determined relationship potentially corresponds to only a small portion of the characteristic 266_2. The determined relationship is compared to many sections of the characteristic 266_2 to determine if any portion of the characteristic 266_2 is the same as or sufficiently similar to the determined relationship to be a good fit. The determined relationship is a good fit, for example, if all of the measured voltage values overlap with a portion of the characteristic 266_2.

Moreover, any type of goodness of fit may be calculated for the relationship. A goodness of fit assesses whether the relationship (or the measured voltage values) is well suited or a good fit to the selected discharge characteristic (the characteristic 266_2 in this example). A goodness of fit test produces a numerical value that relates to how close the relationship (or measured voltage values) are to the selected discharge characteristic. Examples of goodness of fit tests or approaches include the Kolmogorov-Smirnov test (K-S test), the Chi-squared text, R-squared, and regression validation. The result of the goodness of fit test is compared to a fit threshold or range that is stored on the electronic storage 262. If the comparison indicates that the fit is sufficiently close, a good fit is determined to have been found at (325). Otherwise, a good fit is not indicated at (325).

If a good fit is found at (325), the indicator module 240 is controlled to produce an indication of the health status of the internal power source 220 (330). The health status is an estimate of the remaining life of the internal power source 220. For example, and referring to FIG. 2E, the measured voltage values (labeled Vm) are a good fit to a portion 268 of the characteristic 266_2. The discharge capacity Cm_2 is a value that represents the number of hours that the internal power source 220 (at 22° C.) can provide 1 A of current before the self-discharge voltage declines to V_T. The portion 268 corresponds to a discharge capacity C_2. The health status may be, for example, the difference between C_2 and Cm_2, a ratio of C_2/Cm_2, or the value of C_2.

The electronic controller 260 causes the indicator module 240 to produce a perceivable indication that informs a user or operator of the health status. For example, the health status may be compared to the health status specification stored on the electronic storage 262. As discussed above, the health status specification includes categories or classifications that are each associated with a range or a value of the health status and an indication style. The health category or class of the health status is determined, and the indicator module 280 is controlled to produce the associated indication style for that category or class. The process 300 ends (390).

If a good fit is not found at (325), the process 300 returns to (305) and (310) to (325) are performed again.

Figure 4:
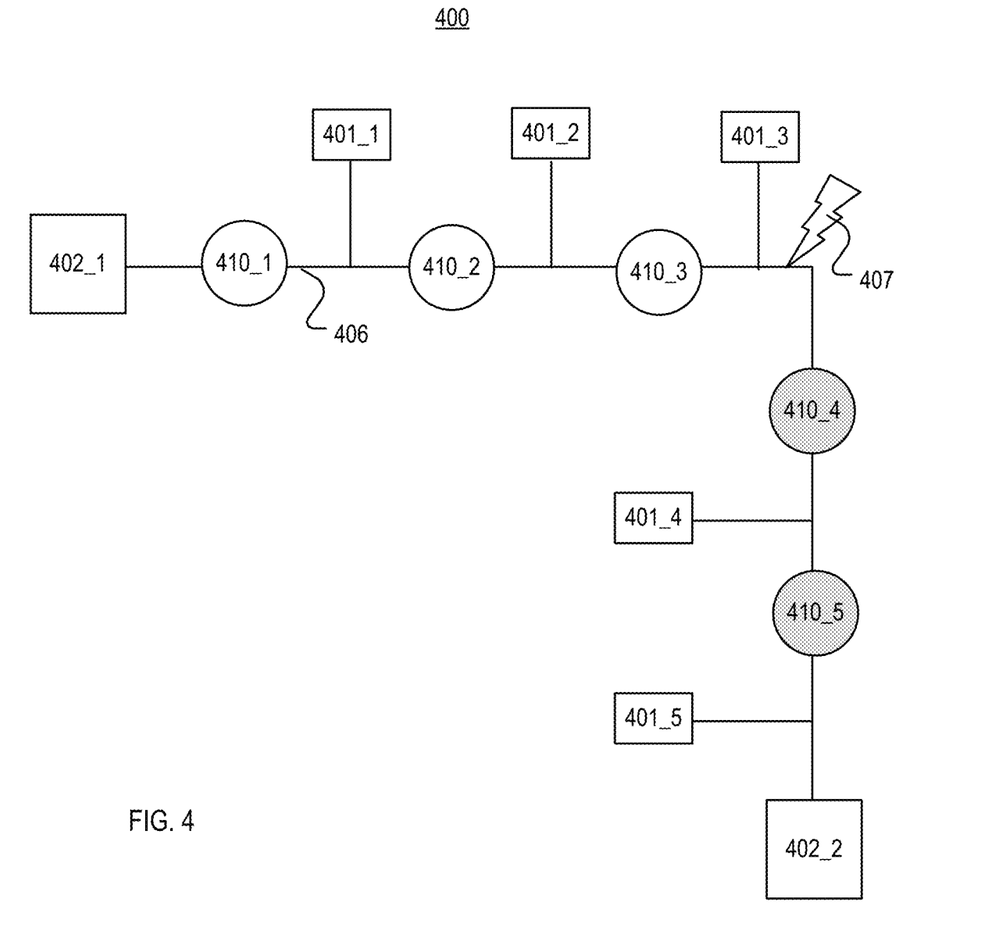
FIG. 4 is a block diagram of an example of a system that includes faulted circuit indicators.

FIG. 4 is a block diagram of a system 400 that includes five faulted circuit indicators: FCI 410_1, FCI 410_2, FCI 410_3, FCI 410_4, and FCI 410_5 (collectively referred to as the FCIs 410). Each of the FCIs 410 is an instance of the FCI 210. The system 400 also includes a distribution path 406, electrical circuits 402_1 and 402_2, and loads 401_1, 401_2, 401_3, 401_4, 401_5. The electrical circuits 402_1 and 402_2, and the loads 401_1, 401_2, 401_3, 401_4, 401_5 are electrically connected to the distribution path 406. The FCIs 410 monitor the distribution path 406 for the presence of faults.

The electrical circuits 402_1 and 402_2 are any type of circuit or electrical device and may be, for example, an electrical source or a connection mechanism (such as a riser) that connects the distribution path 406 to another distribution path or a source of electricity. The loads 401_1, 401_2, 401_3, 401_4, and 401_5 are any type of device or system that utilize electrical power. The distribution path 406 is any type of device or mechanism capable of transferring electrical power. For example, the distribution path 406 may be or include a transmission line, an electrical cable, a riser, a transformer, an electrical connector, or a combination of such devices. In some implementations, the system 400 is underground and/or may be completely or partially enclosed in a housing. The distribution path 406 may be part of a larger electrical power system, such as, for example, an electrical grid, an electrical system, or a multi-phase electrical network that provides electricity to commercial, industrial, and/or residential customers. The system 400 may have an operating voltage of, for example, at least 1 kilovolt (kV), up to 34.5 kV, up to 38 kV, up to 69 kV, or 69 kV or higher. The system 400 is an alternating current (AC) electrical network that operates at a fundamental frequency of, for example, 50 or 60 Hertz (Hz). Additionally, the 400 may be a multi-phase system. For example, the system 400 may be a three-phase system.

In the example shown in FIG. 4, a fault 407 is between the FCI 410_3 and the FCI 410_4. The fault indicator mechanisms 242 of the FCIs 410_1, 410_2, and 410_3 do not indicate a fault, and the fault indicator mechanisms 242 of the FCIs 410_4 and 410_5 indicate a fault. Additionally, the health status indicator mechanism 243 of each of the FCIs 410 informs the operator or user of the system 400 of the each of internal power source. The operator or user of the system 400 is able to determine that the fault is between the FCI 410_3 and the FCI 410_4 by observing the difference between the fault indicator mechanism of the FCI 410_3 and the fault indicator mechanism of the FCI 410_4. Moreover, because each FCI also includes the health status indicator mechanism, the operator or user has confidence that the fault indicator mechanisms 242 are producing reliable data. In other words, the health status indicator mechanisms 243 enable the user or operator to readily differentiate between an FCI that has not detected a fault and an FCI that is not operating due to a failed internal power source.

Thus, the health status indicator mechanism 243 (which provides an indication of the health status of the internal power source 220) improves the performance of the FCIs 410 and the overall performance of the system 400. Furthermore, because the health status determination is based on measured data at the internal power source 220, the health status indicator mechanism 243 is able to provide accurate and precise information to the user or operator of the system 400.

Although five FCIs are shown in FIG. 4, the implementation shown in FIG. 4 is provided an example, and the system 400 may be implemented with more or fewer FCIs. Moreover, although in the example of FIG. 4, each of the FCIs 410 is an instance of the FCI 210, other implementations are possible. For example, all or some of the FCIs 410 may be different in structure. Regardless of the specific implementation of the system 400, each of the FCIs 410 includes an internal power source and provides an indication of the health of that internal power source.

These and other implementations are within the scope of the claims.

What is claimed is:

1. A faulted circuit indicator comprising:
an internal power source;
a sensor system configured to measure a voltage at the internal power source and to measure a temperature at the internal power source;
a controller coupled to the sensor system, wherein the controller is configured to determine a health status of the internal power source based on the measured voltage at the internal power source and the measured temperature at the internal power source; and
an indicator module coupled to the controller, wherein the indicator module is configured to provide an indication of the health status of the internal power source, and the health status of the internal power source is related to an amount of remaining life of the internal power source.

2. The faulted circuit indicator of claim 1, wherein the sensor system comprises a temperature sensor and a voltage sensor, the temperature sensor is configured to measure the temperature at the internal power source, and the voltage sensor is configured to measure the voltage at the internal power source.

3. The faulted circuit indicator of claim 2, wherein the controller comprises an electronic memory that stores at least one characteristic of the internal power source, and the controller is configured to determine the health status of the internal power source based on the measured temperature, the measured voltage, and the at least one characteristic of the internal power source.

4. The faulted circuit indicator of claim 3, wherein the internal power source comprises a battery, the electronic memory stores a plurality of characteristics of the battery, each characteristic is a pre-known relationship between discharge voltage across the battery and capacity of the battery, and each characteristic is associated with a different pre-known temperature.

5. The faulted circuit indicator of claim 4, wherein the health status related to the amount of remaining life of the battery comprises an estimate of a capacity of the battery, and the estimate of the capacity of the battery is based on one of the plurality of characteristics.

6. The faulted circuit indicator of claim 1, further comprising a housing, and wherein the internal power source, the sensor system, and the controller are inside the housing; and the measured temperature is a temperature inside the housing.

7. The faulted circuit indicator of claim 6, wherein the indicator module is on the housing, and the indication is perceivable from an exterior of the housing.

8. The faulted circuit indicator of claim 7, wherein the indicator module comprises one or more of a light, a mechanical switch, and a mechanism configured to produce an audible sound.

9. The faulted circuit indicator of claim 6, wherein the housing comprises a mounting point configured to mount the faulted circuit indicator to a separate device that is electrically connected to a power system.

10. The faulted circuit indicator of claim 6, wherein the sensor system comprises:
a voltage sensor electrically connected to the internal power source and configured to measure a voltage across the internal power source; and
a temperature sensor at the internal power source.

11. The faulted circuit indicator of claim 10, further comprising a switch between the internal power source, the indicator module, and the controller, and wherein, the sensor system is configured to measure the voltage at the internal power source when the switch is open.

12. The faulted circuit indicator of claim 1, wherein the indicator module is configured to provide the indication to a device that is separate from the faulted circuit indicator.

13. The faulted circuit indicator of claim 1, wherein the controller is a microcontroller.

14. The faulted circuit indicator of claim 1, wherein the indication of the health status of the internal power source related to an amount of remaining life of the internal power source comprises an estimate of an amount of life remaining in the internal power source.

15. A controller comprising:
an electronic processing module;
an electronic memory coupled to the electronic processing module, the electronic memory having stored thereon one or more characteristics of an internal power source of a faulted circuit indicator and instructions that, when executed, cause the electronic processing module to:
determine a health status of the internal power source based on at least one of the one or more characteristics of the internal power source and at least one measured operating condition of the internal power source, wherein the health status is related to an amount of remaining life of the internal power source, and the at least one measured operating condition comprises a measured temperature at the internal power source and a measured voltage at the internal power source; and
cause the electronic processing module to communicate with an indicator module such that the indicator module produces a perceivable indication of the health status.

16. The controller of claim 15, wherein the internal power source comprises a battery; the one or more characteristics of an internal power source of a faulted circuit indicator comprises a plurality of pre-known discharge characteristics associated with the battery, and
the at least one measured operating condition comprises a plurality of measured voltage values, each voltage value being a measured voltage across a battery enclosed in a housing of a faulted circuit indicator at a different time;
and the instructions further comprise instructions, that when executed, cause the electronic processing module to:
determine whether a fault occurs in a power system electrically connected to the faulted circuit indicator; and
if a fault does not occur:
access one of the plurality of pre-known discharge characteristics associated with the battery, each of the pre-known discharge characteristics being associated with a pre-known temperature; and
compare the measured voltage values to at least one of the pre-known discharge characteristics.

17. The controller of claim 16 further comprising instructions, that when executed, cause the electronic processing module to, if a fault does not occur:
determine whether any of the plurality of pre-known discharge characteristics fit the measured voltage values based on the comparing of the measured voltage values to at least one of the pre-known discharge characteristics; and
if one of the plurality of pre-known discharge characteristics fits the measured voltage values:
estimate the health status of the battery based on comparing the measured voltage values to the one of the pre-known discharge characteristics.

18. The controller of claim 17, further comprising instructions, that when executed, cause the electronic processing module to:
determine a closest temperature by comparing the measured temperature to the pre-known temperature, and wherein the one of the plurality of pre-known discharge characteristics is the pre-known discharge characteristic associated with the closest temperature.

19. The controller of claim 18, wherein the one of the pre-known discharge characteristics comprises a relationship between voltage and battery capacity for the closest temperature, and to estimate the health status of the battery, the electronic processing module determines a capacity metric that corresponds to one or more of the measured voltage values.

20. The controller of claim 17, further comprising instructions, that when executed, cause the electronic processing module to, if a fault does not occur and if none of the plurality of pre-known discharge characteristics fit the measured voltage values, measure a second plurality of voltage values, each voltage value being a measured voltage across a battery enclosed in the housing of the faulted circuit indicator.

21. The controller of claim 16, further comprising instructions, that when executed, cause the electronic processing module to, if a fault occurs:
reset the faulted circuit indicator; and
after resetting the faulted circuit indicator, measure a second plurality of voltage values, each voltage value being a measured voltage across a battery enclosed in the housing of the faulted circuit indicator at a different time.

22. The controller of claim 21 further comprising instructions, that when executed cause the electronic processing module to, if a fault occurs, discard the measured second plurality of voltage values.

* * * * *